(12) United States Patent
Zhu et al.

(10) Patent No.: US 12,314,161 B2
(45) Date of Patent: May 27, 2025

(54) METHOD AND APPARATUS FOR CONTROLLING READ TIMING, AND COMPUTER-READABLE STORAGE MEDIUM

(71) Applicants: Chongqing BOE Optoelectronics Technology Co., Ltd., Chongqing (CN); BOE Technology Group Co., Ltd., Beijing (CN)

(72) Inventors: Wentao Zhu, Beijing (CN); Gaoming Sun, Beijing (CN); Jingchao Yuan, Beijing (CN); Zhiheng Zhou, Beijing (CN); Hongxin Pan, Beijing (CN); Jingpeng Zhao, Beijing (CN); Xin Duan, Beijing (CN)

(73) Assignees: Chongqing BOE Optoelectronics Technology Co., Ltd., Chongqing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/037,087

(22) PCT Filed: Apr. 22, 2022

(86) PCT No.: PCT/CN2022/088597
§ 371 (c)(1),
(2) Date: May 16, 2023

(87) PCT Pub. No.: WO2023/201731
PCT Pub. Date: Oct. 26, 2023

(65) Prior Publication Data
US 2024/0345943 A1    Oct. 17, 2024

(51) Int. Cl.
*G06F 12/02*    (2006.01)

(52) U.S. Cl.
CPC .................. *G06F 12/0223* (2013.01)

(58) Field of Classification Search
CPC .................................................. G06F 12/0223
See application file for complete search history.

(56) References Cited

U.S. PATENT DOCUMENTS

| 5,717,440 A | 2/1998 | Katsura et al. |
| 2010/0332743 A1 | 12/2010 | Zheng et al. |

(Continued)

FOREIGN PATENT DOCUMENTS

| CN | 101246460 A | 8/2008 |
| CN | 101325696 A | 12/2008 |

(Continued)

OTHER PUBLICATIONS

International Search Report for PCT/CN2022/088597 Mailed Jan. 5, 2023.

*Primary Examiner* — Masud K Khan
(74) *Attorney, Agent, or Firm* — Ling Wu; Stephen Yang; Ling and Yang Intellectual Property

(57) ABSTRACT

A method and an apparatus for controlling read timing, and a computer-readable storage medium. The apparatus for controlling read timing includes an on-chip memory. The method for controlling read timing includes: writing input data into the on-chip memory; performing an end-of-frame detection on the input data; after detecting an end of a frame, counting input data rows and generating a read timing according to a preset Porch parameter; determining whether the on-chip memory will be read to be empty or written to be full according to an input data row count and the generated read timing; and when the on-chip memory will be read to be empty or written to be full, adjusting the read timing until the on-chip memory will not be read to be empty or written to be full, and reading and outputting data of the on-chip memory according to the read timing.

20 Claims, 5 Drawing Sheets

(56) References Cited

U.S. PATENT DOCUMENTS

| | | | |
|---|---|---|---|
| 2013/0215002 | A1 | 8/2013 | Shen et al. |
| 2018/0349036 | A1 | 12/2018 | Ellis et al. |
| 2020/0050520 | A1* | 2/2020 | Ogawa ................ G06F 11/0721 |
| 2020/0117392 | A1* | 4/2020 | Schaefer ............... G06F 3/0659 |

FOREIGN PATENT DOCUMENTS

| | | | | | |
|---|---|---|---|---|---|
| CN | 101789222 | A | | 7/2010 | |
| CN | 102855838 | A | | 1/2013 | |
| CN | 104464813 | A | * | 3/2015 | ........... G06F 1/3287 |
| CN | 107516296 | A | | 12/2017 | |
| CN | 108052750 | A | | 5/2018 | |
| CN | 110940841 | A | | 3/2020 | |
| CN | 112218012 | A | | 1/2021 | |
| CN | 113110821 | A | | 7/2021 | |
| CN | 113485647 | A | | 10/2021 | |

\* cited by examiner

METHOD AND APPARATUS FOR CONTROLLING READ TIMING, AND COMPUTER-READABLE STORAGE MEDIUM

CROSS-REFERENCE TO RELATED APPLICATION

The present application is a U.S. National Phase Entry of International Application No. PCT/CN2022/088597 having an international filing date of Apr. 22, 2022, the content of which is incorporated into this application by reference.

TECHNICAL FIELD

Embodiments of the present disclosure relate to, but not limited to, the field of display driving technologies, and particularly to a method and an apparatus for controlling read timing, and a computer-readable storage medium.

BACKGROUND

When a display interface transmits data, there is a certain positional relationship between active data and a starting signal (a frame synchronization signal Vs/a row synchronization signal Hs). This relationship is usually characterized by a set of Porch parameters. For example, the Porch parameters include the total number of horizontal rows (HTotal), the number of horizontal active rows (HActive), horizontal synchronization (HSYNC), Horizontal Back Porch (HBack Porch, HBP), Horizontal Front Porch (HFront Porch, HFP), horizontal blanking (HBlanking), end of active video (EAV), starting of active video (SAV), the total number of vertical rows (VTotal), the number of vertical active rows (VActive), Vertical Front Porch (VFront Porch, VFP), vertical blanking interval (VBI), Vertical Back Porch (VBack Porch, VBP), vertical blanking (VBlanking), etc. VBP represents the number of inactive rows after a frame synchronization signal at starting of one frame of image, VFP represents the number of inactive rows before a frame synchronization signal after an end of one frame of image, HBP represents the number of clock signals between starting of a row synchronization signal and starting of one row of active data, and HFP represents the number of clock signals between an end of one row of active data and starting of a next row synchronization signal.

As shown in FIG. 1, when a Field Programmable Gate Array (FPGA) is taken as a display drive scheme, a "Porch transfer" operation is usually performed on data, i.e., after data input by a front end according to a Porch parameter A is received, the data is sent out in a preset Porch parameter B. The advantage of this operation lies in that: when display debugging is performed, it needs often to adjust the relative position between a Data Source and a Gate Driver on Array (GOA) in order to improve the display effect, which can be implemented very conveniently based on "Porch transfer" (by modifying the preset Porch parameter).

SUMMARY

The following is a summary of subject matters described herein in detail. The summary is not intended to limit the protection scope of claims.

An embodiment of the present disclosure provides a method for controlling read timing, which is applied to an apparatus for controlling read timing, the apparatus for controlling read timing includes an on-chip memory. The method for controlling read timing includes:
  writing input data into the on-chip memory;
  performing an end-of-frame detection on the input data;
  after detecting an end of a frame, counting input data rows, and generating a read timing according to a preset Porch parameter;
  determining whether the on-chip memory will be read to be empty or written to be full according to an input data row count and the generated read timing; and
  when the on-chip memory will be read to be empty or written to be full, adjusting the read timing until the on-chip memory will not be read to be empty or written to be full, and reading and outputting data of the on-chip memory according to the read timing.

In some exemplary implementations, the performing an end-of-frame detection on the input data includes:
  detecting a width of a low level of an input DE signal; and
  when the width of the low level of the input DE signal is greater than or equal to a preset first width threshold, determining a position of current input data as an end-of-frame position.

In some exemplary implementations, the counting input data rows includes: counting the input data rows according to a rising edge of an input DE signal.

In some exemplary implementations, the generating a read timing according to a preset Porch parameter includes:
  taking an end of a frame as a starting point, counting an output row counter and an output column counter according to the preset Porch parameter, when output data is at an end of a row, resetting the output row counter, and recounting the output row counter at starting of outputting of a next row of data; and when the output data is at an end of a frame, resetting the output column counter, and recounting the output column counter at starting of outputting of a next frame of data; and
  generating the read timing according to values of the output row counter and the output column counter.

In some exemplary implementations, the generating the read timing according to values of the output row counter and the output column counter includes:
  determining a first range and a second range according to the preset Porch parameter, wherein the first range represents an active data column of a display panel, the second range represents an active data row of the display panel, and the first range and the second range represent an active data area of the display panel;
  when the output row counter is in the first range and the output column counter is in the second range, setting a read control signal to be a high level; and
  when the output row counter is outside the first range or the output column counter is outside the second range, setting the read control signal to be a low level.

In some exemplary implementations, the first range is determined according to the total number of horizontal rows (HTotal), Horizontal Back Porch (HBP) and Horizontal Front Porch (HFP), and the second range is determined according to the total number of vertical rows (VTotal), Vertical Front Porch (VFP) and Vertical Back Porch (VBP).

In some exemplary implementations, the adjusting the read timing when the on-chip memory will be read to be empty or written to be full includes:
  when the on-chip memory will be read to be empty, increasing the Vertical Back Porch (VBP) to delay a high-level read control signal; and when the on-chip memory will be written to be full, reducing the Vertical Back Porch (VBP) to advance the high-level read control signal.

In some exemplary implementations, the adjusting the read timing when the on-chip memory will be read to be empty or written to be full includes:

when the on-chip memory will be read to be empty, increasing the Vertical Front Porch (VFP) to delay the high-level read control signal; and when the on-chip memory will be written to be full, reducing the Vertical Front Porch (VFP) to advance the high-level read control signal.

In some exemplary implementations, the on-chip memory includes: a first-in first-out (FIFO) memory or a block random access memory (BRAM).

An embodiment of the present disclosure further provides an apparatus for controlling read timing, including: a read-write control circuit and an on-chip memory, wherein the read-write control circuit is configured to write input data into the on-chip memory, perform an end-of-frame detection on the input data, after detecting an end of a frame, count input data rows, and generate a read timing according to a preset Porch parameter, determine whether the on-chip memory will be read to be empty or written to be full according to an input data row count and the generated read timing, and when the on-chip memory will be read to be empty or written to be full, adjust the read timing until the on-chip memory will not be read to be empty or written to be full, and read and output data of the on-chip memory according to the read timing; and the on-chip memory is configured to store the input data.

In some exemplary implementations, the apparatus for controlling read timing further includes a timing circuit, wherein the timing circuit is configured to generate a row synchronization signal and a frame synchronization signal according to the preset Porch parameter, and generate a data active signal according to a read timing adjusted by the read-write control circuit.

An embodiment of the present disclosure further provides an apparatus for controlling read timing, including: a memory; and a processor connected to the memory, wherein the memory is configured to store instructions, the memory further includes an on-chip memory, the processor is configured to perform acts of the method for controlling read timing according to any one of the embodiments of the present disclosure based on the instructions stored in the memory.

An embodiment of the present disclosure further provides a computer-readable storage medium storing a computer program, and when the program is executed by a processor, the method for controlling read timing according to any one of the embodiments of the present disclosure is implemented.

Other aspects may be comprehended upon reading and understanding drawings and detailed descriptions.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure, without constituting limitations on the technical solutions of the present disclosure. Shapes and sizes of various components in the drawings do not reflect actual scales, but are only intended to schematically illustrate contents of the present disclosure.

DETAILED DESCRIPTION

To make objectives, technical solutions, and advantages of the present disclosure clearer, the embodiments of the present disclosure will be described in detail below with reference to the accompanying drawings. It is to be noted that the embodiments in the present disclosure and features in the embodiments may be randomly combined with each other if there is no conflict.

Unless otherwise defined, technical terms or scientific terms publicly used in the embodiments of the present disclosure should have usual meanings understood by those of ordinary skills in the art to which the present disclosure belongs. "First", "second", and similar terms used in the embodiments of the present disclosure do not represent any order, quantity, or importance, but are only used for distinguishing different components. "Include", "contain", or a similar term means that an element or article appearing before the term covers an element or article and equivalent thereof listed after the term, and other elements or articles are not excluded.

Figure 1:
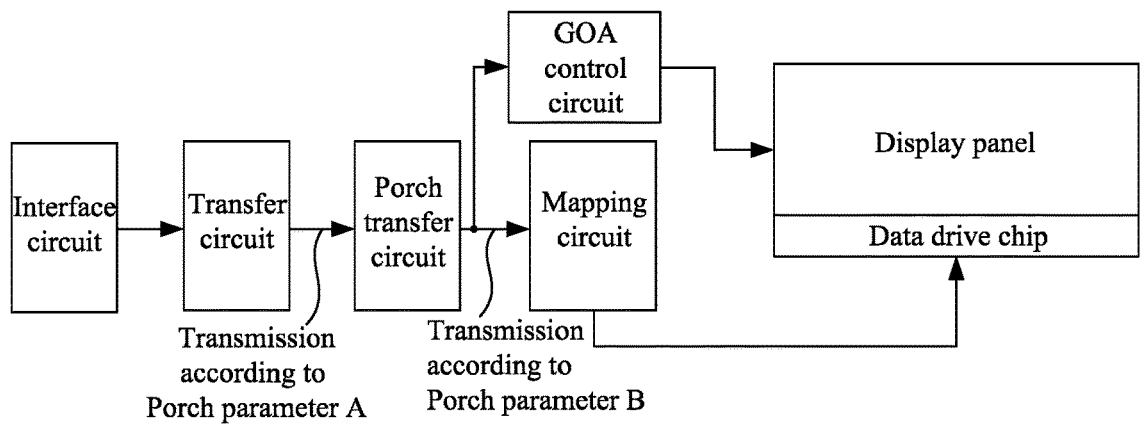
FIG. 1 is a schematic diagram of an architecture of an exemplary display drive control system.
Figure 2:
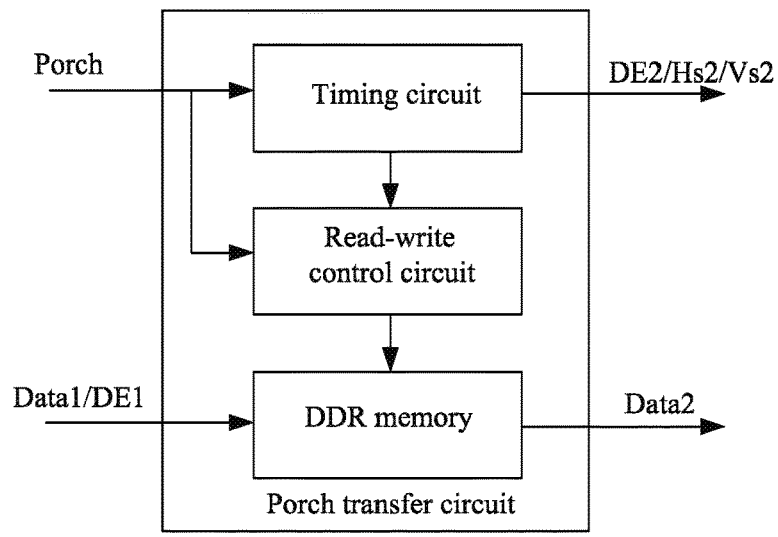
FIG. 2 is a schematic diagram of an implementation scheme of an exemplary Porch transfer circuit.

A Porch transfer scheme may be summed up as "frame buffer+double data rate synchronous dynamic random access memory (DDR)", and its system implementation architecture is shown in FIG. 2. The implementation principle thereof is as follows: generating, by a Sync gen circuit, a DE/Hs/Vs signal according to a preset Porch parameter (i.e., a Porch parameter B in FIG. 1), wherein a DE signal is a data active signal, Hs is a row synchronization signal and Vs is a frame synchronization signal; generating, by a read-write (write/read) control circuit, a read control signal of a DDR memory based on the preset Porch parameter; and outputting, by the DDR memory, a data signal Data according to the read control signal. Since Data and DE/Hs/Vs are essentially generated based on the Porch parameter, they may be synchronized in principle. In other words, the output data does satisfy this set of preset Porch parameters.

Since "frame buffer" is adopted, i.e., the stored data uses frame as a unit, an association between a front end (i.e., a player) input and a back end (i.e., a display panel) may be cut off as much as possible, i.e., the front end and the back end work according to their respective timings, and there is almost no intersection except data. In addition, the implementation of "frame buffer" needs to be based on a relatively large storage space, so DDR is generally selected as a storage scheme. However, read and write operations are relatively complicated for DDR, resulting in relatively long programming and debugging periods, which is one of the main factors that limit the application of this scheme.

Embodiments of the present disclosure provide a method and an apparatus for controlling read timing, which are greatly reduced in implementation difficulty due to usage of an on-chip storage resource as an implementation manner, and substantially require no debugging, thereby effectively reducing the debugging period.

Figure 3:
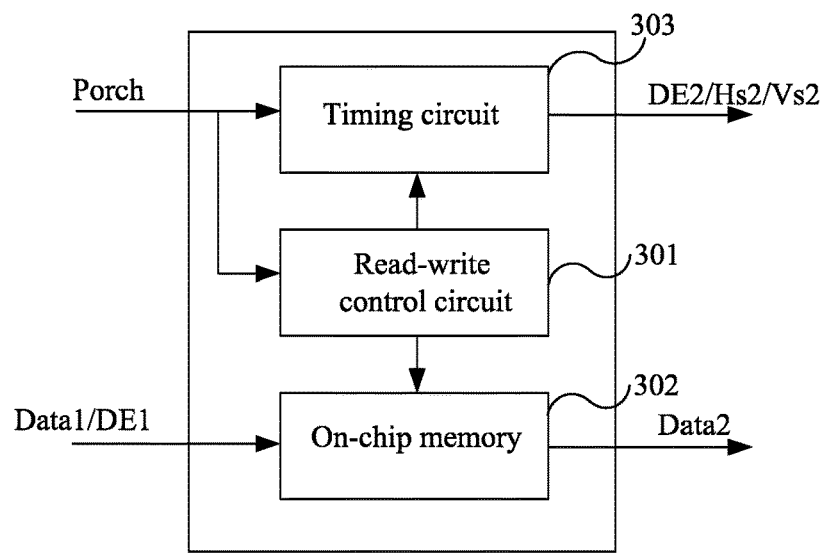
FIG. 3 is a schematic diagram of a structure of an apparatus for controlling read timing according to an exemplary embodiment of the present disclosure.

As shown in FIG. 3, an embodiment of the present disclosure provides an apparatus for controlling read timing, including: a read-write control circuit 301 and an on-chip memory 302.

The read-write control circuit 301 is configured to write input data into the on-chip memory 302, perform an end-of-frame detection on the input data, after detecting an end of a frame, count input data rows, and generate a read timing according to a preset Porch parameter, determine whether the on-chip memory 302 will be read to be empty or written to be full according to an input data row count and the generated read timing, and when the on-chip memory 302 will be read to be empty or written to be full, adjust the read timing, and read and output data of the on-chip memory 302 according to the read timing.

The on-chip memory 302 is configured to store the input data.

The apparatus for controlling read timing according to the embodiment of the present disclosure adopts an on-chip memory as a storage carrier, and the on-chip memory is a built-in storage resource of the apparatus for controlling read timing, so that the read-write control timing is greatly simplified, the implementation difficulty is greatly reduced, and debugging is substantially unnecessary, thereby effectively reducing the debugging period.

In some exemplary implementations, the storage capacity of the on-chip memory 302 may be set, which, however, is not limited in the embodiments of the present disclosure. Since the on-chip memory 302 generally has a limited storage capacity, compared with the "frame buffer+DDR" scheme, the apparatus for controlling read timing according to an embodiment of the present disclosure may be summed up as "row buffer+on-chip memory", and it needs to ensure that the on-chip memory "is not read to be empty or written to be full". In other words, a correlation of read and write timings needs to be considered (relatively speaking, the read and write timings of the DDR scheme are substantially independent), and a reasonable time interval shall be maintained between read and write timings. An excessively large interval will cause the on-chip memory 302 to be written to be full and active data to be lost; and an excessively small interval will cause the on-chip memory 302 to be read to be empty and errors to be doped in active data. In view of this problem, the apparatus for controlling read timing according to an embodiment of the present disclosure adopts an approach of automatically adjusting a read-write timing to adjust a read timing, which can ensure that the read and write timings have a reasonable time interval.

The read-write control circuits in FIG. 2 and FIG. 3 have the same name, but their functions are not completely the same. In the DDR memory scheme, the read-write control circuit is used for controlling the input and output of DDR, and the content will be relatively complicated. In the on-chip memory scheme, the read-write control circuit 301 is used for controlling the input and output of the on-chip memory 302 and realizing automatic adjustment of a read timing, which is relatively simple on the whole.

In some exemplary implementations, as shown in FIG. 3, the apparatus for controlling read timing further includes a timing circuit 303, wherein the timing circuit 303 is configured to generate an Hs signal and a Vs signal according to a preset Porch parameter, and generate a DE signal according to a read timing adjusted by the read-write control circuit 303.

The function of the timing circuit in FIG. 2 is to generate a DE signal, an Hs signal and a Vs signal according to a preset Porch parameter. The function of the timing circuit 303 in FIG. 3 is to generate an Hs signal and a Vs signal according to a preset Porch parameter, and generate a DE signal according to a read sequence adjusted by the read-write control circuit 301. Thus, the functions of the two timing circuits are not completely the same.

The apparatus for controlling read timing according to an embodiment of the present disclosure may be implemented by a Field Programmable Gate Array (FPGA) or an Application Specific Integrated Circuit (ASIC), and may also be implemented by other programmable devices, which is not limited in the present disclosure.

In some exemplary implementations, the read-write control circuit 301, the on-chip memory 302 and the timing circuit 303 may all be implemented by FPGA.

The timing circuit 303 and the read-write control circuit 301 in the present disclosure may be implemented by a plurality of FPGA code logics, and the present disclosure only limits the functions of the timing circuit 303 and the read-write control circuit 301, and does not limit specific code logics.

In some exemplary implementations, the on-chip memory 302 may include a memory such as First Input First Output (FIFO), or a Block Random Access Memory (BRAM), etc.

Exemplarily, the on-chip memory 302 may be implemented using a built-in FIFO IP core of FPGA. The built-in FIFO IP core of the FPGA typically has an Empty-Full flag signal, and this signal may be used as a basis to determine whether a read timing is reasonable.

Exemplarily, the on-chip memory 302 may be implemented by a BRAM. The BRAM is a built-in storage unit of an FPGA chip, which, and like the FIFO, is also a small capacity storage. Therefore, both BRAM and FIFO may be used for row buffer. In order to prevent write full or read to be empty, strict control of read and write timings is required, which is a problem faced by both BRAM and FIFO. Since an operation on BRAM usually involves address and data, it is slightly more complicated than that on an FIFO operation (which only involves data). However, the operation difficulties of both BRAM and FIFO are far less than the operation difficulty of DDR.

The apparatus for controlling read timing according to an embodiment of the present disclosure may be applied to a Porch transfer circuit in display drive, and may also be applied to any other scene requiring Porch transfer or read timing control, which is not limited in the present disclosure.

As shown in FIG. 1 and FIG. 3, the timing circuit 303 generates a DE2 signal, an Hs2 signal, and a Vs2 signal according to a preset Porch parameter (i.e., the Porch parameter B in FIG. 1) and a read timing adjusted by the read-write control circuit 301. Before the apparatus for controlling read timing, data is transmitted according to a Porch parameter A, i.e., input signals of the Porch transfer circuit are a Data1 signal, a DE1 signal, an Hs1 signal and a Vs1 signal, the DE1 signal, Hs1 signal and Vs1 signal are generated by the front end according to the Porch parameter A. Output signals of the apparatus for controlling read timing are the Data2 signal, DE2 signal, Hs2 signal and Vs2 signal.

In a process of display data transmission, the function of the Vs signal is to identify a starting point position of each frame of data, and the function of the Hs signal is to identify a starting point position of each row of data.

In video signals input to a display panel, active video signals (active RGB signals) only are a part of a signal period, and active video data is not included during row blanking and column blanking of signals. Therefore, for some circuits, during video signals are processed, an interval containing active video signals must be distinguished from a blanking interval not containing active video signals. In order to distinguish between active and inactive video signals, a DE signal is set in a circuit. The DE signal is a signal which is active at a high level, and a video data signal corresponding to when the DE signal is at a high level of is considered as an active data signal.

In the five kinds of signals, i.e., the DE signal, the Hs signal, the Vs signal, a clock signal CLK and a digital signal Data, the DE signal, the Hs signal and the Vs signal are synchronization signals, CLK is a clock signal, Data is a data signal, and they generally appear at the same time, and the DE signal, the Hs signal, the Vs signal and the digital signal Data all keep synchronization with the clock signal CLK.

During a high level of the DE signal, and at a rising or falling edge of the clock signal CLK, a relevant circuit reads RGB data to ensure correctness of read data. A condition of high level of the DE signal when data is read actually means selecting active data, i.e., for a back-end circuit, a read control signal generated according to a read timing is the DE signal.

In some exemplary implementations, a width of the high level of the DE signal is equal to a value of the number of horizontal active rows (HActive). For example, if the number of horizontal active rows (HActive) is equal to 100, the width of the high level of the DE signal is 100 clock units.

In some exemplary implementations, the performing an end-of-frame detection on the input data includes: detecting a width of a low level of an input DE signal; and when the width of the low level of the input DE signal is greater than or equal to a preset first width threshold, determining a position of current input data as an end-of-frame position.

Figure 4:
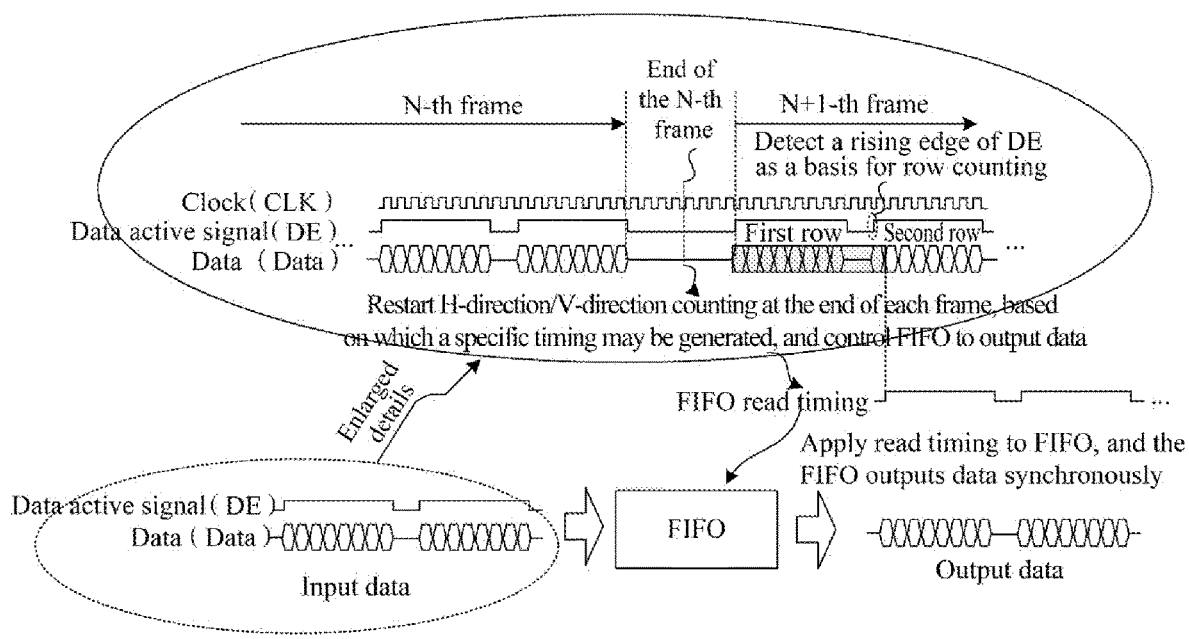
FIG. 4 is a schematic flowchart of automatically adjusting a timing according to an exemplary embodiment of the present disclosure.

In this embodiment, the end-of-frame detection on the input data may be performed according to the width of the low level of the input DE signal. For example, as shown in FIG. 4, the end-of-frame detection on the input data may be performed according to an interval between a falling edge of a previous square wave and a rising edge of a next square wave in the input DE signal.

Exemplarily, the width of the low level of the DE signal between rows is about hundreds of clock intervals, e.g., 100 to 200 clock intervals; and the width of the low level of the DE signal between frames is about thousands of clock intervals, e.g., 1000 to 2000 clock intervals. Thus, the first width threshold may be set to x clock intervals, and for example, x may be 800, which, however, is not limited in the present disclosure.

In some exemplary implementations, input data rows are counted according to a rising edge of the input DE signal.

Edge detection of signals is widely used in the field of digital circuits. Therefore, the rising edge of the input DE signal may be used as a basis for counting input data rows. As shown in FIG. 4, every time the rising edge of the DE signal is detected, the input data is considered to be increased by one row, that is, the input data row counter is increased by one.

Figure 6A:
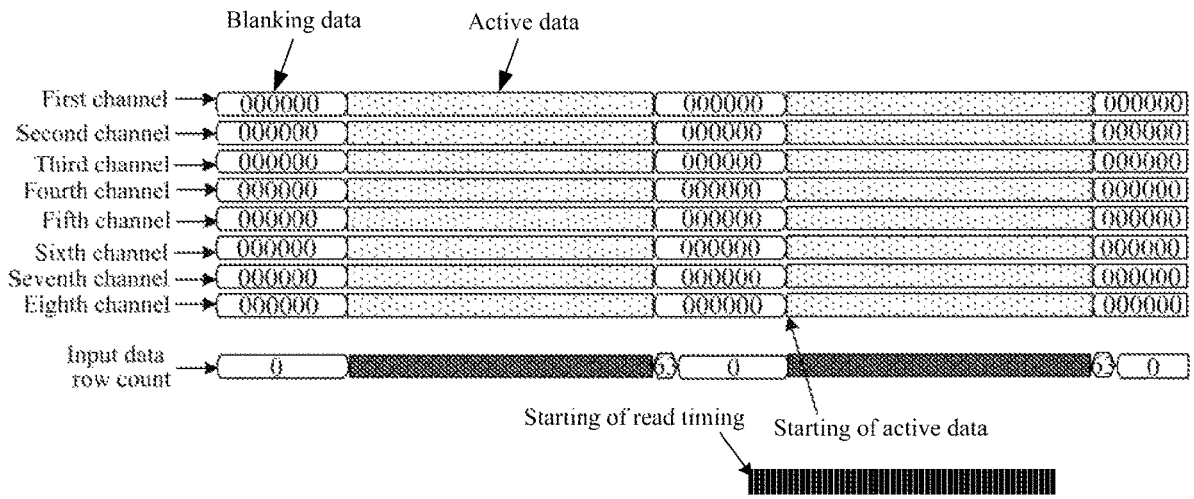
FIG. 6A and FIG. 6B are schematic diagrams illustrating two exemplary cases where read-write timing intervals are not reasonable according to the present disclosure.
Figure 6B:
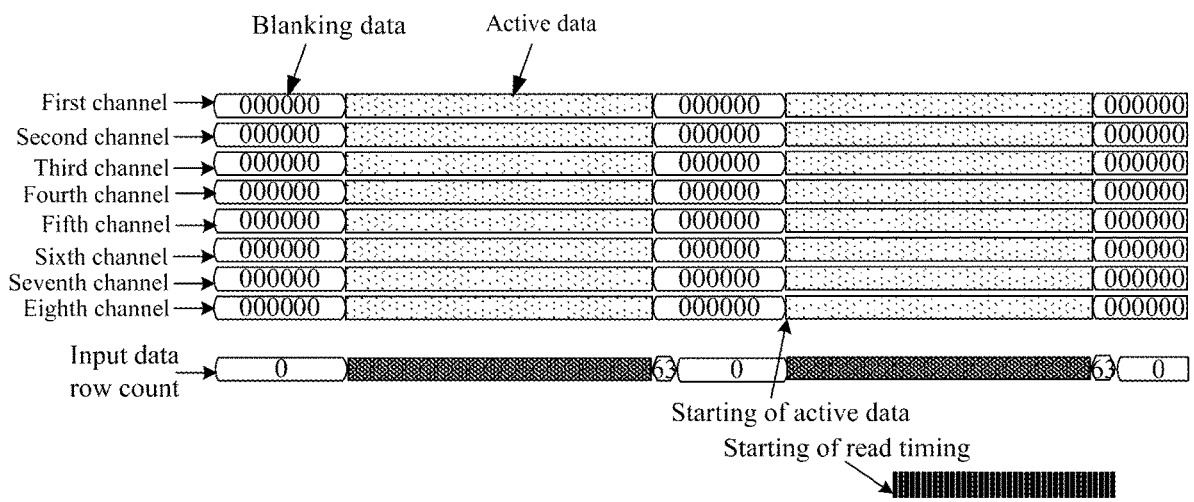

In an embodiment of the present disclosure, the counting of the input data rows is only directed to active data, and not to blanking data. As shown in FIG. 6A or 6B, there are eight channels for input data, data from the first channel to the eighth channel constitute one frame of data, 000000 represents blanking data, and in a blanking data area, the input data row counter is always 0; and in an active data area, the input data row counter is increased from 1 to the maximum number of rows (for example, the maximum number of rows may be 63). Then a next frame of data is transmitted, and the input data row counter is cleared to start counting again.

Figure 5:
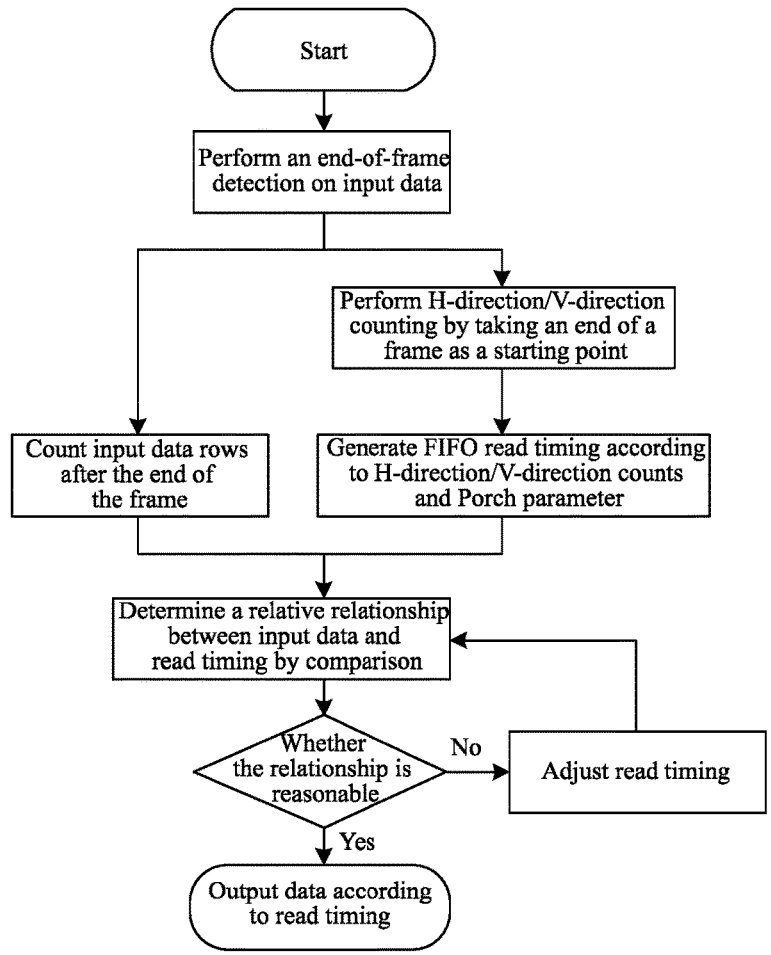
FIG. 5 is a schematic flowchart of a method for controlling read timing according to an exemplary embodiment of the present disclosure.

In some exemplary implementations, as shown in FIG. 5, the generating a read timing according to a preset Porch parameter includes: designing an output row counter (H-direction counter) and an output column counter (V-direction counter) respectively; taking an end of a frame as a starting point, counting the output row counter and the output column counter according to the preset Porch parameter, when output data is at an end of a row, resetting the output row counter (i.e., the value of the output row counter is cleared) and recounting the output row counter at starting of outputting of a next row of data; and when the output data is at the end of the frame, resetting the output column counter (i.e., the value of the output column counter is cleared) and recounting the output column counter at starting of outputting of a next frame of data; and generating the read timing according to values of the output row counter and the output column counter.

In an embodiment of the present disclosure, after an end of a frame is detected, the input data row counter does not start to perform counting immediately, but has to wait until a next frame of active data comes over, and is added by 1 after each row is transmitted. The output row counter (the H-direction counter) and the output column counter (the V-direction counter) will start to perform counting at a time point when the end of the frame is detected, as a starting point.

In an embodiment of the present disclosure, the H-direction counter counts from 0 to HTotal, and the V-direction counter counts from 0 to VTotal, but only when the H-direction counter is in the first range and the V-direction counter is in the second range, the output data is active. Exemplarily, the first range may be determined according to values of the total number of horizontal rows (HTotal), HBack Porch (HBP) and HFront Porch (HFP), and the second range may be determined according to values of the total number of vertical rows (VTotal), VFront Porch (VFP) and VBack Porch (VBP).

In some exemplary implementations, the generating the read timing according to values of the output row counter and the output column counter includes: determining a first range and a second range according to the preset Porch parameter, wherein the first range represents an active data column of a display panel, the second range represents an active data row of the display panel, and the first range and the second range represent an active data area of the display panel; when the output row counter is in the first range and the output column counter is in the second range, enabling the read control signal (i.e., setting the read control signal to a high level); and when the output row counter is outside the first range or the output column counter is outside the second range, disabling the read control signal (i.e., setting the read control signal to a low level).

In an embodiment of the present disclosure, whether the positional relationship between the input data row count and the generated read timing will cause the on-chip memory to be read to be empty or written to be full is detected; and when the positional relationship between the input data row count and the generated read timing will cause the on-chip memory to be read to be empty or written to be full, the generated read timing is unreasonable.

For example, it is assumed that at the time of design, the capacity of the on-chip memory is designed to buffer only one row of data (in actual usage, the capacity of the on-chip memory may be designed to buffer multiple rows of data, which, however, is not limited in the present disclosure). In FIG. 4, the read timing (relative to the input data row count) is enabled relatively later, resulting in the amount of data that needs to be buffered exceeding one row (as shown in gray shading in FIG. 4), then the generated read timing is unreasonable, and a high-level read control signal in the read timing just needs to be advanced.

FIG. 6A and FIG. 6B are schematic diagrams illustrating two exemplary cases where read-write timing intervals are not reasonable according to the present disclosure. The first-type unreasonableness is that the corresponding on-chip memory is read to be empty. As shown in FIG. 6A, the high-level read control signal is excessively advanced (when reading starts, active data has not yet appeared). The second-type unreasonableness is that the corresponding on-chip memory is written to be full. As shown in FIG. 6B, the high-level read control signal is excessively delayed (when reading starts, several rows of active data have passed, and the number of rows has exceeded the capacity of the on-chip memory).

In some exemplary implementations, the adjusting the read timing when the on-chip memory will be read to be empty or written to be full includes:

when the on-chip memory will be read to be empty, increasing the VBack Porch (VBP) to delay a high-level read control signal; and when the on-chip memory will be written to be full, reducing the VBack Porch (VBP) to advance the high-level read control signal.

Figure 7A:
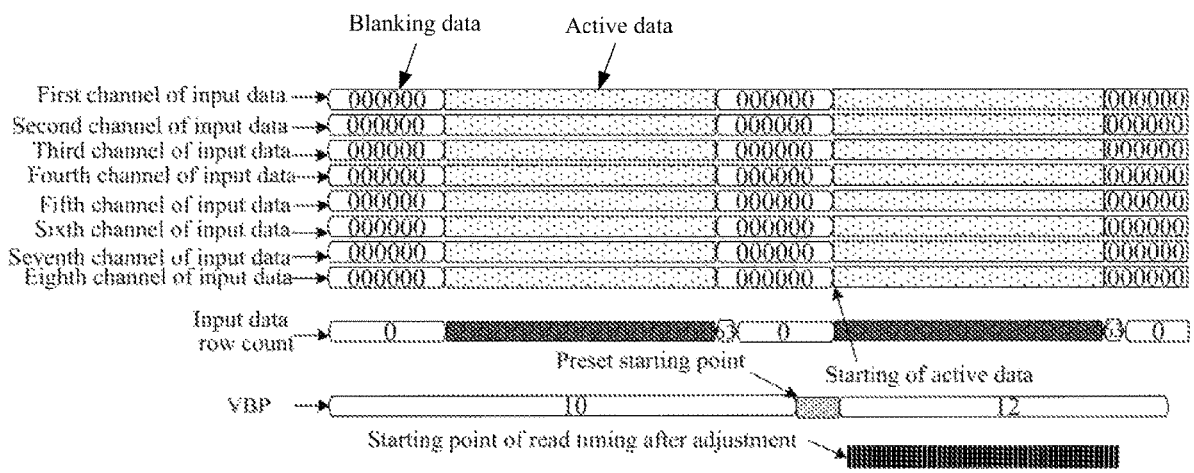
FIG. 7A is an improved effect diagram after a read timing control flow is adopted according to an embodiment of the present disclosure for FIG. 6A.
Figure 7B:
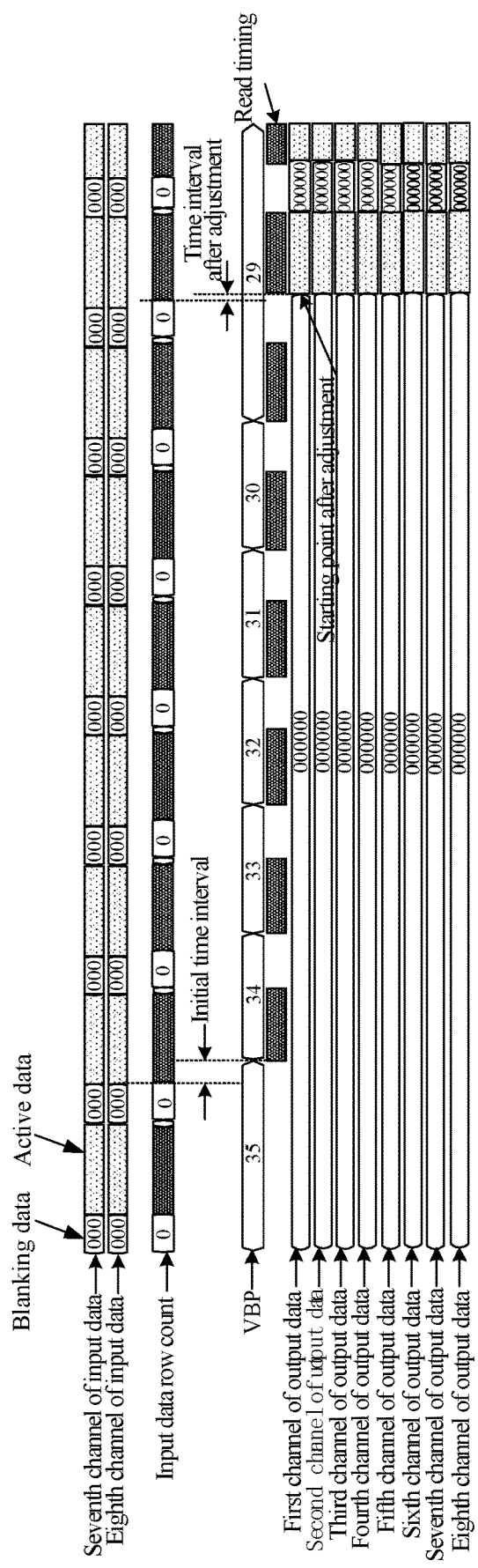
FIG. 7B is an improved effect diagram after a read timing control flow is adopted according to an embodiment of the present disclosure for FIG. 6B.

Exemplarily, after an approach of automatically adjusting the read and write timings is adopted in view of the above two types of unreasonableness, the actual improvement is shown in FIG. 7A and FIG. 7B. For the first-type unreasonableness, as shown in FIG. 7A, increasing the VBP will automatically delay the high-level read control signal in the read timing. For the second-type unreasonableness, as shown in FIG. 7B, reducing the VBP will automatically advance the high-level read control signal in the read timing. Through such adjustment, it can be ensured that the time interval of read and write timings is within a reasonable range, thus ensuring that no error will occur in data transmission.

In some other exemplary implementations, the adjusting the read timing when the on-chip memory will be read to be empty or written to be full includes: when the on-chip memory will be read to be empty, increasing the VFront Porch (VFP) to delay the high-level read control signal; and when the on-chip memory will be written to be full, reducing the VFront Porch (VFP) to advance the high-level read control signal.

Figure 8:
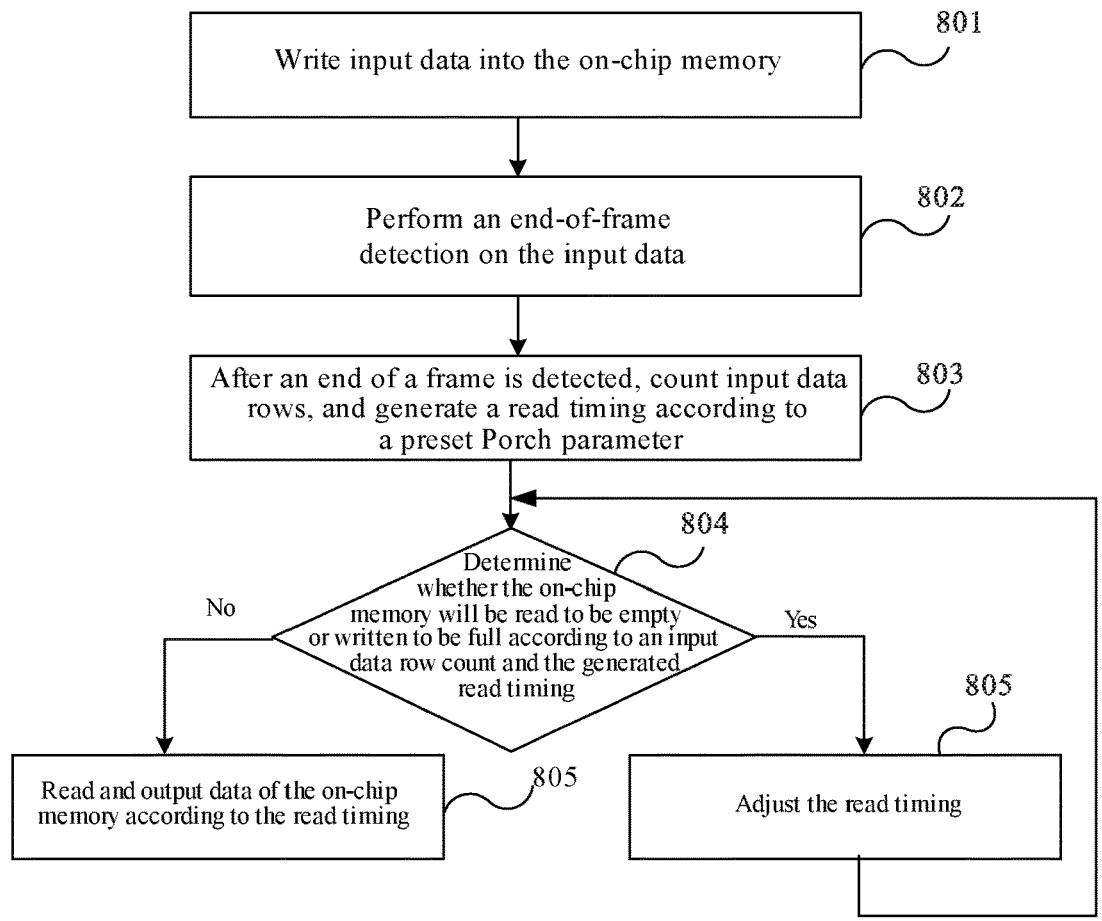
FIG. 8 is a schematic flowchart of another method for controlling read timing according to an exemplary embodiment of the present disclosure.

As shown in FIG. 8, an embodiment of the present disclosure further provides a method for controlling read timing, including the following acts:

In act 801, input data is written into the on-chip memory.

In act 802, an end-of-frame detection is performed on the input data.

In act 803, after an end of a frame is detected, input data rows is counted, and a read timing is generated according to a preset Porch parameter.

In act 804, whether the on-chip memory will be read to be empty or written to be full is determined according to an input data row count and the generated read timing.

In act 805, when the on-chip memory will be read to be empty or written to be full, the read timing is adjusted until the on-chip memory will not be read to be empty or written to be full, and data of the on-chip memory is read and output according to the read timing.

In the method for controlling read timing according to an embodiment of the present disclosure, an on-chip memory is used as a storage carrier. The on-chip memory is a built-in storage resource of an apparatus for controlling read timing. Thus, the read-write control timing according to an embodiment of the present disclosure is greatly simplified, thereby greatly reducing the implementation difficulty and substantially requiring no debugging, thus effectively reducing the debugging period.

The method for controlling read timing according to an embodiment of the present disclosure may be implemented by a Field Programmable Gate Array (FPGA) or an Application Specific Integrated Circuit (ASIC), and may also be implemented by other programmable devices, which is not limited in the present disclosure.

The method for controlling read timing according to an embodiment of the present disclosure may be implemented by a plurality of FPGA code logics, and the present disclosure only limits the flow of the method, and does not limit specific code logics.

The method for controlling read timing according to an embodiment of the present disclosure may be applied to a Porch transfer circuit in display drive, and may also be applied to other scenes requiring Porch transfer or read timing control, which is not limited in the present disclosure.

In some exemplary implementations, an end-of-frame detection is performed on the input data, which includes: a width of a low level of an input DE signal is detected; and when the width of the low level of the input DE signal is greater than or equal to a preset first width threshold, a position of current input data is determined as an end-of-frame position.

In some exemplary implementations, the input data rows are counted, which includes: the input data rows are counted according to a rising edge of the input DE signal.

In some exemplary implementations, a read timing is generated according to a preset Porch parameter, which includes: an end of a frame is taken as a starting point, an output row counter and an output column counter are counted according to the preset Porch parameter, when output data is at an end of a row, the output row counter is reset, and the output row counter is recounted at starting of outputting of a next row of data; and when the output data is at the end of the frame, the output column counter is reset, and the output column counter is recounted at starting of outputting of a next frame of data; and the read timing is generated according to values of the output row counter and the output column counter.

In some exemplary implementations, the read timing is generated according to values of the output row counter and the output column counter, which includes: a first range and a second range are determined according to the preset Porch parameter, wherein the first range represents an active data column of a display panel, the second range represents an active data row of the display panel, and the first range and the second range represent an active data area of the display panel; when the output row counter is in the first range and the output column counter is in the second range, a read control signal is set to be a high level; and when the output row counter is outside the first range or the output column counter is outside the second range, the read control signal is set to be a low level.

In some exemplary implementations, the first range is determined according to the total number of horizontal rows (HTotal), HBack Porch (HBP) and HFront Porch (HFP), and the second range is determined according to the total number of vertical rows (VTotal), VFront Porch (VFP) and VBack Porch (VBP).

In some exemplary implementations, when the on-chip memory will be read to be empty or written to be full, the read timing is adjusted, which includes: when the on-chip memory will be read to be empty, the VBack Porch (VBP) is increased to delay a high-level read control signal; and when the on-chip memory will be written to be full, the VBack Porch (VBP) is reduced to advance the high-level read control signal.

In some exemplary implementations, when the on-chip memory will be read to be empty or written to be full, the read timing is adjusted, which includes: when the on-chip memory will be read to be empty, the VFront Porch (VFP) is increased to delay the high-level read control signal; and when the on-chip memory will be written to be full, the VFront Porch (VFP) is reduced to advance the high-level read control signal.

In some exemplary implementations, the on-chip memory includes: a first-in first-out (FIFO) memory or a block random access memory (BRAM).

An embodiment of the present disclosure further provides an apparatus for controlling read timing. The apparatus for controlling read timing may include a processor and a memory storing a computer program runnable on the processor, when the processor executes the computer program, acts of the method for controlling read timing according to any one of the preceding embodiments in the present disclosure are implemented.

Figure 9:
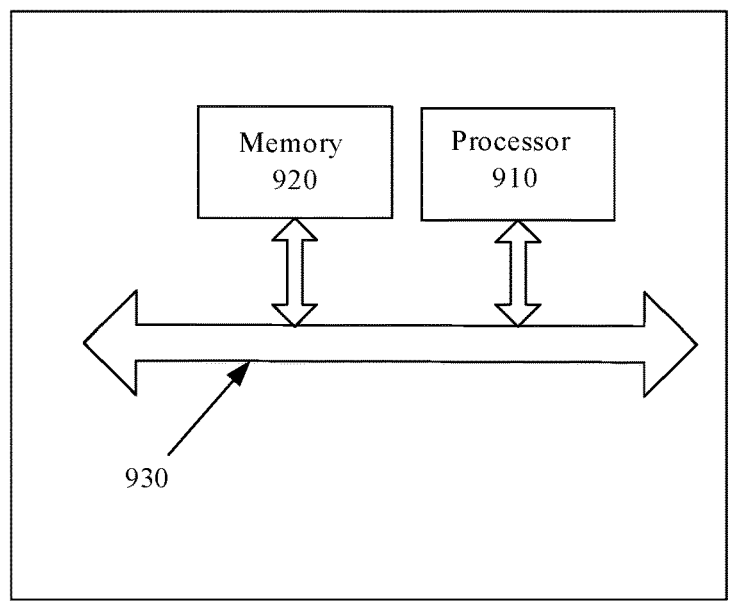
FIG. 9 is a schematic diagram of a structure of an apparatus for controlling read timing according to an exemplary embodiment of the present disclosure.

As shown in FIG. 9, in an example, the apparatus for controlling read timing may include: a processor 910, a memory 920 and a bus system 930. The processor 910 and the memory 920 are connected through the bus system 930, the memory 920 is configured to store instructions, the memory 920 further includes an on-chip memory, the processor 910 is configured to execute the instructions stored in the memory 920 to write input data into the on-chip memory; perform an end-of-frame detection on the input data; after detecting an end of a frame, count input data rows, and generate a read timing according to a preset Porch parameter; determine whether the on-chip memory will be read to be empty or written to be full according to an input data row count and the generated read timing; and when the on-chip memory will be read to be empty or written to be full, adjust the read timing, and read and output data of the on-chip memory according to the read timing.

It should be understood that the processor 910 may be a Central Processing Unit (CPU), and the processor 910 may also be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor, or the processor may also be any conventional processor, etc.

The memory 920 may include a read-only memory and a random access memory, and provides instructions and data to the processor 910. A portion of the memory 920 may also include a non-volatile random access memory. For example, the memory 920 may also store information of a device type.

The bus system 930 may include a power bus, a control bus, a status signal bus, or the like in addition to a data bus. However, for clarity of illustration, various buses are all denoted as the bus system 930 in FIG. 9.

In an implementation process, processing performed by a processing device may be completed by an integrated logic circuit of hardware in the processor 910 or instructions in a form of software. That is, the acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory 920. The processor 910 reads information in the memory 920, and completes the acts of the above method in combination with its hardware. In order to avoid repetition, detailed description is not provided herein.

An embodiment of the present disclosure also provides a computer-readable storage medium. The computer-readable storage medium stores executable instructions, and when the executable instructions are executed by a processor, the method for controlling read timing provided by any of the above embodiments of the present disclosure may be implemented. The method for controlling read timing may write input data into the on-chip memory; perform an end-of-frame detection on the input data; after detecting an end of a frame, count input data rows and generate a read timing according to a preset Porch parameter; determine whether the on-chip memory will be read to be empty or written to be full according to an input data row count and the generated read timing; and when the on-chip memory will be read to be empty or written to be full, adjust the read timing, and read and output data of the on-chip memory according to the read timing, so that the read-write control timing is greatly simplified, the implementation difficulty is greatly reduced, and debugging is substantially unnecessary, thereby effectively reducing the debugging period. The method of driving read timing control by executing executable instructions is substantially the same as the method for controlling read timing provided in the above embodiments of the present disclosure, which will not be further described here.

In some possible implementations, various aspects of the method for controlling read timing provided by the present application may also be implemented as a form of a program product, which includes a program code, wherein when the program product runs on a computer device, the program code is used to cause the computer device to perform acts in the method for controlling read timing according to various exemplary implementations of the present application described above in this specification, for example, the computer device may perform the method for controlling read timing described in the embodiments of the present application.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of the readable storage medium include electrical connections with one or more wires, portable computer disks, hard disks, random access memories (RAM), read-only memories (ROM), erasable programmable read-only memories (EPROM or flash memories), optical fibers, portable compact disk read-only memories (CD-ROM), optical storage devices, magnetic storage devices, or any suitable combination of the above.

It may be understood by those of ordinary skills in the art that all or some acts in a method and function modules/units in a system and an apparatus disclosed above may be implemented as software, firmware, hardware, and appropriate combinations thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology for storing information (for example, a computer-readable instruction, a data structure, a program module, or other data). The computer storage medium includes, but not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skills in the art that the communication medium usually includes a computer-readable instruction, a data structure, a program module, or other data in a modulated data signal of, such as, a carrier or another transmission mechanism, and may include any information delivery medium.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modifications and variations in forms and details of implementation without departing from the spirit and scope of the present disclosure. However, the patent protection scope of the present invention should be subject to the scope defined by the appended claims.

The invention claimed is:

1. A method for controlling read timing, which is applied to an apparatus for controlling read timing comprising an on-chip memory, the method for controlling read timing comprising:
   writing input data into the on-chip memory;
   performing an end-of-frame detection on the input data;
   after detecting an end of a frame, counting input data rows, and generating a read timing according to a preset Porch parameter;
   determining whether the on-chip memory will be read to be empty or written to be full according to an input data row count and the generated read timing; and
   when the on-chip memory will be read to be empty or written to be full, adjusting the read timing until the on-chip memory will not be read to be empty or written to be full, and reading and outputting data of the on-chip memory according to the read timing.

2. The method for controlling read timing according to claim 1, wherein the performing an end-of-frame detection on the input data comprises:
   detecting a width of a low level of an input data active signal; and
   when the width of the low level of the input data active signal is greater than or equal to a preset first width threshold, determining a position of current input data as an end-of-frame position.

3. The method for controlling read timing according to claim 1, wherein the counting input data rows comprises: counting the input data rows according to a rising edge of an input data active signal.

4. The method for controlling read timing according to claim 1, wherein the generating a read timing according to a preset Porch parameter comprises:
   taking an end of a frame as a starting point, counting an output row counter and an output column counter according to the preset Porch parameter, when output data is at an end of a row, resetting the output row counter, and recounting the output row counter at starting of outputting of a next row of data; and when the output data is at an end of a frame, resetting the output column counter, and recounting the output column counter at starting of outputting of a next frame of data; and
   generating the read timing according to values of the output row counter and the output column counter.

5. The method for controlling read timing according to claim 4, wherein the generating the read timing according to values of the output row counter and the output column counter comprises:
   determining a first range and a second range according to the preset Porch parameter, wherein the first range represents an active data column of a display panel, the second range represents an active data row of the display panel, and the first range and the second range represent an active data area of the display panel;
   when the output row counter is in the first range and the output column counter is in the second range, setting a read control signal to be a high level; and
   when the output row counter is outside the first range or the output column counter is outside the second range, setting the read control signal to be a low level.

6. The method for controlling read timing according to claim 5, wherein the first range is determined according to a total number of horizontal rows (HTotal), Horizontal Back Porch (HBP) and Horizontal Front Porch (HFP), and the second range is determined according to a total number of vertical rows (VTotal), Vertical Front Porch (VFP) and Vertical Back Porch (VBP).

7. The method for controlling read timing according to claim 6, wherein the adjusting the read timing when the on-chip memory will be read to be empty or written to be full comprises:
when the on-chip memory will be read to be empty, increasing the Vertical Back Porch (VBP) to delay a high-level read control signal; and
when the on-chip memory will be written to be full, reducing the Vertical Back Porch (VBP) to advance the high-level read control signal.

8. The method for controlling read timing according to claim 6, wherein the adjusting the read timing when the on-chip memory will be read to be empty or written to be full comprises:
when the on-chip memory will be read to be empty, increasing the Vertical Front Porch (VFP) to delay the high-level read control signal; and
when the on-chip memory will be written to be full, reducing the Vertical Front Porch (VFP) to advance the high-level read control signal.

9. The method for controlling read timing according to claim 1, wherein the on-chip memory comprises: a first-in first-out (FIFO) memory or a block random access memory (BRAM).

10. An apparatus for controlling read timing, comprising a memory; and a processor connected to the memory, wherein the memory is configured to store instructions, the memory further comprises an on-chip memory, the processor is configured to perform acts of the method for controlling read timing according to claim 1 based on the instructions stored in the memory.

11. A computer-readable non-transitory storage medium storing a computer program, when the program is executed by a processor, the method for controlling read timing according to claim 1 is implemented.

12. An apparatus for controlling read timing, comprising: a read-write control circuit and an on-chip memory, wherein
the read-write control circuit is configured to write input data into the on-chip memory, perform an end-of-frame detection on the input data, after detecting an end of a frame, count input data rows, and generate a read timing according to a preset Porch parameter, determine whether the on-chip memory will be read to be empty or written to be full according to an input data row count and the generated read timing, and when the on-chip memory will be read to be empty or written to be full, adjust the read timing until the on-chip memory will not be read to be empty or written to be full, and read and output data of the on-chip memory according to the read timing; and
the on-chip memory is configured to store the input data.

13. The apparatus for controlling read timing according to claim 12, further comprising a timing circuit, wherein
the timing circuit is configured to generate a row synchronization signal and a frame synchronization signal according to the preset Porch parameter, and generate a data active signal according to a read timing adjusted by the read-write control circuit.

14. The apparatus for controlling read timing according to claim 12, wherein
the read-write control circuit is configured to detect a width of a low level of an input data active signal; and when the width of the low level of the input data active signal is greater than or equal to a preset first width threshold, determine a position of current input data as an end-of-frame position.

15. The apparatus for controlling read timing according to claim 12, wherein the read-write control circuit is configured to count the input data rows according to a rising edge of an input data active signal.

16. The apparatus for controlling read timing according to claim 12, wherein the read-write control circuit is configured to take an end of a frame as a starting point, count an output row counter and an output column counter according to the preset Porch parameter, when output data is at an end of a row, reset the output row counter, and recount the output row counter at starting of outputting of a next row of data; and when the output data is at an end of a frame, reset the output column counter, and recount the output column counter at starting of outputting of a next frame of data; and generate the read timing according to values of the output row counter and the output column counter.

17. The apparatus for controlling read timing according to claim 16, wherein the read-write control circuit is configured to determine a first range and a second range according to the preset Porch parameter, wherein the first range represents an active data column of a display panel, the second range represents an active data row of the display panel, and the first range and the second range represent an active data area of the display panel; when the output row counter is in the first range and the output column counter is in the second range, set a read control signal to be a high level; and when the output row counter is outside the first range or the output column counter is outside the second range, set the read control signal to be a low level.

18. The apparatus for controlling read timing according to claim 17, wherein the first range is determined according to a total number of horizontal rows (HTotal), Horizontal Back Porch (HBP) and Horizontal Front Porch (HFP), and the second range is determined according to a total number of vertical rows (VTotal), Vertical Front Porch (VFP) and Vertical Back Porch (VBP).

19. The apparatus for controlling read timing according to claim 18, wherein the read-write control circuit is configured to, when the on-chip memory will be read to be empty, increase the Vertical Back Porch (VBP) to delay a high-level read control signal; and when the on-chip memory will be written to be full, reduce the Vertical Back Porch (VBP) to advance the high-level read control signal.

20. The apparatus for controlling read timing according to claim 18, wherein the read-write control circuit is configured to, when the on-chip memory will be read to be empty, increase the Vertical Front Porch (VFP) to delay the high-level read control signal; and when the on-chip memory will be written to be full, reduce the Vertical Front Porch (VFP) to advance the high-level read control signal.

* * * * *